(12) United States Patent
Ohtsu

(10) Patent No.: US 7,583,395 B2
(45) Date of Patent: Sep. 1, 2009

(54) IMAGE FORMING APPARATUS AND IMAGE FORMING METHOD WITH SYNCHRONOUS AND ASYNCHRONOUS CONTROL FOR CONTINUOUS OPERATION

(75) Inventor: Akira Ohtsu, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1972 days.

(21) Appl. No.: 10/003,257

(22) Filed: Dec. 6, 2001

(65) Prior Publication Data

US 2002/0080382 A1    Jun. 27, 2002

(30) Foreign Application Priority Data

Dec. 6, 2000    (JP) .............................. 2000-371896

(51) Int. Cl.
*G06K 15/00* (2006.01)
*G03G 15/00* (2006.01)

(52) U.S. Cl. ...................... 358/1.14; 358/1.16; 399/83

(58) Field of Classification Search ............... 358/1.14, 358/1.16; 399/83
See application file for complete search history.

(56) References Cited

U.S. PATENT DOCUMENTS

| | | | | |
|---|---|---|---|---|
| 5,845,057 A * | 12/1998 | Takeda et al. | ............... | 358/1.15 |
| 6,621,592 B1 * | 9/2003 | Takayama et al. | ........... | 358/1.16 |
| 7,209,247 B1 * | 4/2007 | Iwadate | ..................... | 358/1.14 |
| 7,304,753 B1 * | 12/2007 | Richter et al. | ............... | 358/1.15 |
| 2005/0024680 A1 * | 2/2005 | Tanaka | ....................... | 358/1.16 |

FOREIGN PATENT DOCUMENTS

JP      07-271702      10/1995

* cited by examiner

*Primary Examiner*—Twyler L Haskins
*Assistant Examiner*—Fred Guillermety
(74) *Attorney, Agent, or Firm*—Foley & Lardner LLP

(57) ABSTRACT

An image forming method reads a document by a scanner that is a device, provides image data corresponding to a document image, forms an image corresponding to the image data provided from the scanner by a printer that is a device, and detects operating errors of the scanner and the printer. Further, when any operating error is detected, the image forming method stops the operation of the device generating the error and operates the device not generating the error.

2 Claims, 7 Drawing Sheets

<SYNCHRONOUS CONTROL>

<ASYNCHRONOUS CONTROL>

IMAGE FORMING APPARATUS AND IMAGE FORMING METHOD WITH SYNCHRONOUS AND ASYNCHRONOUS CONTROL FOR CONTINUOUS OPERATION

CROSS-REFERENCE TO RELATED APPLICATION

This application is based upon and claims the benefit of priority from the prior Japanese Application No. 2000-371896, filed on Dec. 6, 2000; the entire contents of which are incorporated herein by reference.

BACKGROUND OF THE INVENTION

1. Field of the Invention

The present invention relates to an image forming apparatus such as a digital copier, etc. and an image forming method.

2. Description of the Related Art

When a scanner and a printer are operated in parallel with each other in an image forming apparatus comprising a scanner and a printer, if an error relative to the printer was taken place the operation of the scanner was so far stopped until the error is solved. For example, if "No Paper" error was taken place on a printer while copying plural number of documents, not only the printer but also the scanner was stopped to operate.

Thus, for a trouble taken on either one of the scanner and the printer, the operation of the other was suspended and the operation was inefficient and productivity was dropped.

SUMMARY OF THE INVENTION

An object of the present invention is to provide an image forming apparatus that improves the image forming efficiency even if a trouble is generated on either a scanner or a printer by continuing the operation of a device that does not cause a trouble and an image forming method.

According to the present invention, an image forming apparatus is provided. The image forming apparatus comprises: a scanner to read a document and provide image data corresponding to a document image; a printer to form an image corresponding to the image data provided from the scanner; an error detector to detect an operating error of the scanner and the printer that are devices; and a controller to stop an operation of the device that cause the error and operate the device only that did not cause the error when the error detector detects the operating error.

Further, according to the present invention, an image forming method is provided. The image forming method comprises: reading a document by a scanner that is a device to provide image data corresponding to a document image; forming an image corresponding to the image data provided from the scanner by a printer that is a device; detecting operating errors of the scanner and the printer; and suspending the operation of the device generating an error and operating the device not generating an error when the operating error is detected.

DETAILED DESCRIPTION OF THE INVENTION

Figure 1:
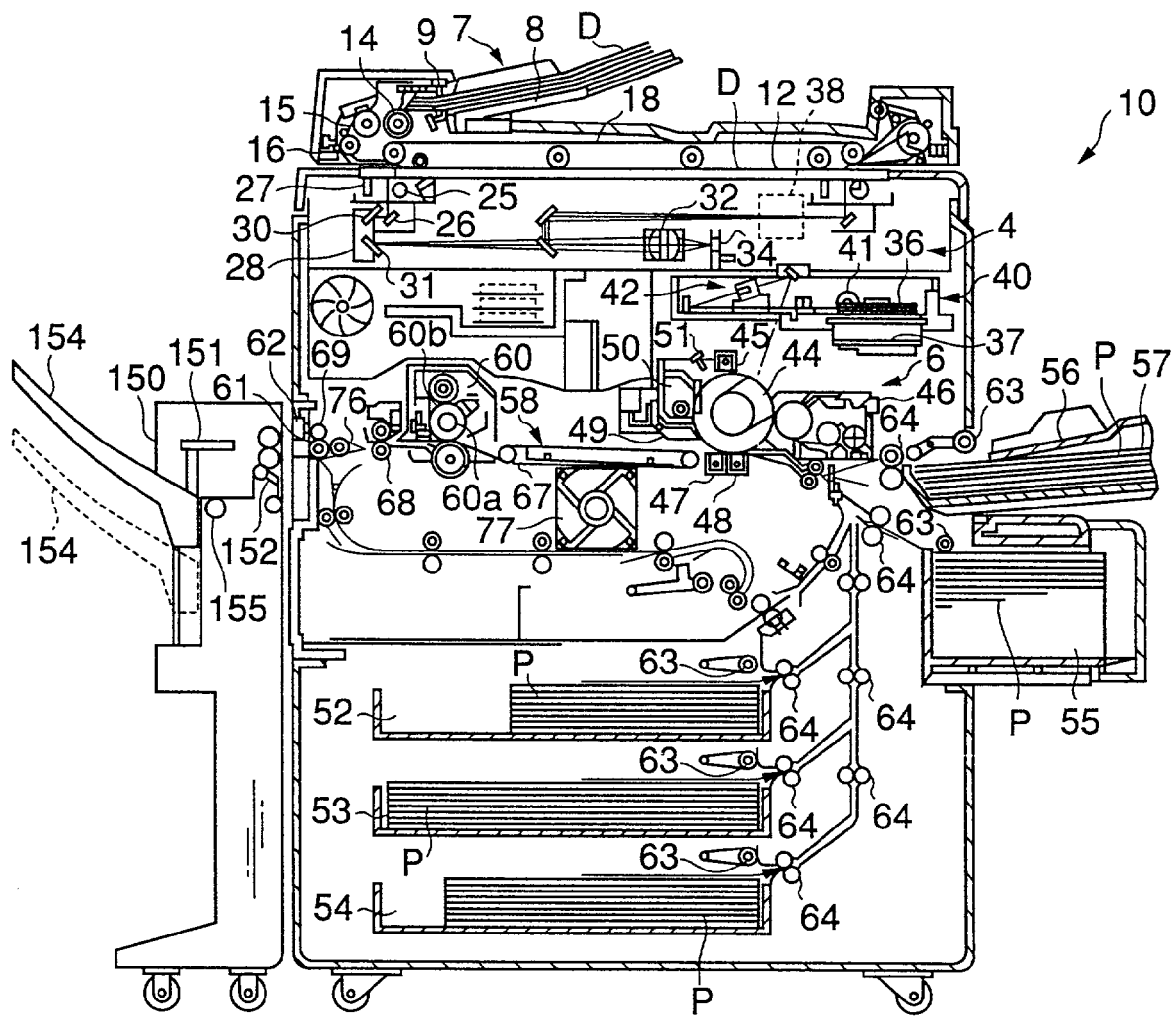
FIG. 1 is a sectional view showing the internal structure of a digital copier as an embodiment of the image forming apparatus of the present invention.

A preferred embodiment of the present invention will be described below in detail referring to the drawings.

FIG. 1 is a sectional view showing the internal structure of a digital copier 10 as an embodiment of the present invention. In the digital copier 10, a scanner unit 4 that functions as a reading means which will be described later and a printer unit 6 that functions as an image forming means are provided.

On the top of the digital copier 10, there is a document table 12 comprising a transparent glass on which a reading object, that is, an original document D is placed. In addition, on the top of the digital copier 10, an automatic document feeder 7 (hereinafter, referred to ADF) is provided for automatically feeding an original document D. The ADF 7 can be opened/closed from/to the document table 12 and also functions as a document presser to press documents D placed on the document table 12 closely to the document table 12.

The ADF 7 comprises a document tray 8 on which a document D is set, an empty sensor 9 for detecting presence of a document D, a pick-up roller 14 for pick up a document D one by one from the document tray 8, a paper feed roller 15 for conveying the picked up document D, an aligning roller pair 16 for aligning the leading edge of a document D, and a conveyor belt 18 provided to cover almost the entirety. Multiple original documents D that are set on the document tray 8 with the image surfaces turned upward are taken out in order from the lowest page, that is, the last page and after aligned by the aligning roller 16, conveyed to a prescribed position of the document table 12 by the conveyor belt 18.

The scanner unit 4 provided in the digital copier 10 has an exposure lamp 25 that is a light source to illuminate a document D placed on the document table 10 and a first mirror 26 that deflects the reflected light from the document D in a prescribed direction. The exposure lamp 25 and the first mirror 26 are mounted to a first carriage 27 that is provided below the document table 12.

The first carriage 27 is arranged movable in parallel with the document table 12 and is reciprocated below the document table 12 by a driving motor 38 via a toothed belt (not shown), etc.

Further, below the document table 12, there is a second carriage 28 that is movable in parallel with the document table 12. Second and third mirrors 30 and 31 that deflect the reflected light from the document D that was deflected by the first mirror 26 in order are mounted at a right angle to each other. The second carriage 28 is driven by the toothed belt, etc. to drive the first carriage 27 following the first carriage 27 and is moved in parallel with the document table at a ½ speed to the first carriage.

Further, below the document table 12, a focusing lens 32 for focusing the reflected light from the third mirror 31 on the second carriage 28 and a CCD sensor 34 for receiving and photoelectric transferring the reflected light focused by the focusing lens 32 are provided.

On the other hand, the printer unit 6 is equipped with a laser-exposing device 40 that acts as an exposing scanning device. The laser exposing device 40 is provided with a semiconductor laser 41 as a light source, a polygonal mirror 36 as a scanning member to successively deflect the laser beam emitted from the semiconductor laser 41, a motor 37 as a scanning motor to drive the polygonal mirror 36 at a prescribed number of revolutions, and a laser optical unit 42 to deflect the laser beam from the polygonal mirror 36 and lead to a photoconductive drum 44. This drum 44 will be described later. The laser-exposing device 40 in such structure as described above is fixed to and supported by a supporting frame (not shown) of the digital copier 12.

The semiconductor laser 41 is turned ON/OFF according to the image data of a document D read by the scanner unit 4, the laser beam is deflected toward the photoconductive drum 44 via the polygonal mirror 36 and the laser optical unit 42 in the laser exposing device 40, and an electrostatic latent image is formed on the photoconductive drum by scanning the surface of the photoconducive dram 44.

Around the photoconductive drum 44, a main charger 45 for charging the surface of the photoconductive drum 44 to a prescribed potential before an image is formed thereon, a developing device 46 as a developing means for developing the electrostatic latent image formed on the surface of the photoconductive drum 44 at a desired image density by supplying toners as developing agents to the latent image, a separation charger for separating an image forming medium, that is, a sheet of paper P from the photoconductive drum 44 are provided in one unit, and further, a transferring charger 48 for transferring a toner image formed on the photoconductive drum 44 on a sheet of paper P, a separation claw 49 for separating a sheet of paper P from the surface of the photoconductive drum 44, a cleaner 50 for cleaning toners left on the surface of the photoconductive drum 44, and a charge eliminator 51 for eliminating charge of the surface of the photoconductive drum 44 are arranged in order. The photoconductive drum 44, and a developing roller (not shown) in the developing device 46 are driven by a main motor 77.

At the lower portion in the digital copier 10, an upper paper cassette 52, a middle paper cassette 53 and a lower paper cassette 54 are provided in the stacked state. These paper cassettes can be pulled out of the main body and sheets of paper P in different sizes are accommodated in respective cassettes. A large volume paper feeder 55 is provided at the side of these cassettes. In this large volume paper feeder 55, for example, about 3,000 sheets of paper P in a size in highly frequent usage are accommodated. Further, above the large volume paper feeder 55, a paper cassette 57 that also serves as a manual paper feed tray 56 is installed detachably.

In the digital copier 10, a conveying path extending from respective paper cassettes and the large volume paper feeder 55 and passing through the image transferring unit positioned between the photoconductive drum 44 and the transferring charger 48 is formed. At the end of the conveying path 58, there is provided a fixing device 60 that has a fixing lamp 60a and a heat roller 60b to which the heat is given from this fixing lamp 60. On the sidewall of the digital copier 10 opposing to the fixing device 60, a discharge port 61 that has a single tray finisher 150 is installed.

Near the upper, middle and lower paper cassettes 52, 53, 54, the paper cassette 57 and the large volume paper feeder 57, a pick-up roller 63 is provided to each of these paper cassettes and feeder for taking out paper P one by one. Further, a number of paper feed roller pairs 64 are provided on the conveying path 58 for conveying the sheets of paper P taken out by the pick-up rollers 63.

The sheets of paper P taken out one by one from the paper cassettes or the large volume paper feeder 55 are conveyed to an aligning roller pair 65 by the paper feed roller pair 64. Then, the sheets of paper P are conveyed to the image-transferring unit after the aligning roller pair 65 aligns the leading edges.

In the image transferring unit, a developer image formed on the photoconductive drum 44, that is, a toner image is transferred on a sheet of paper P by the transferring charger that is a transferring means. The sheet of paper P having a transferred toner image is separated from the surface of the photoconductive drum 44 by the actions of the separation charger 47 and the separation claw 49 and conveyed to the fixing device 60 on the conveyor belt 67 that comprises a part of the conveying path 52. Then, after a developer image is fused and fixed on the sheet of paper P by the fixing device 60, the sheet of paper P is discharged on the finisher 150 through the discharge port 61 by the paper feed roller pair 68 and the paper discharge roller pair 69. Near the paper discharge roller pair 69, a discharged paper sensor 62 is provided for detecting the discharge of a paper P.

The finisher 150 staples discharged documents in unit of one copy and stores. Every time when one sheet of paper P to be stapled is discharged, it is aligned to the side to be stapled by a guide bar 151. When all sheets of paper P are discharged, a paper-pressing arm presses them 152 and stapled by a stapler unit (not shown). Then, the guide bar 151 moves down and the stapled one copy of paper P is discharged on a paper-receiving tray 154 by a paper discharge roller 155.

The paper-receiving tray 154 is moved down whenever sheets of paper P for one copy are discharged by stages. Further, the paper-receiving tray 154 is connected to a shift mechanism (not shown) that is shifted (for example, the longitudinal and lateral four directions) in the soft mode or the group mode. Here, the soft mode is a mode wherein plural sheets of documents are printed in plural number of sheets and divided into each copy and for example, page numbers of printed pages become consecutive numbers. The group mode is a mode wherein plural sheets of documents are read and divided into each page and the same page is printed in plural number of sheets.

Figure 2:
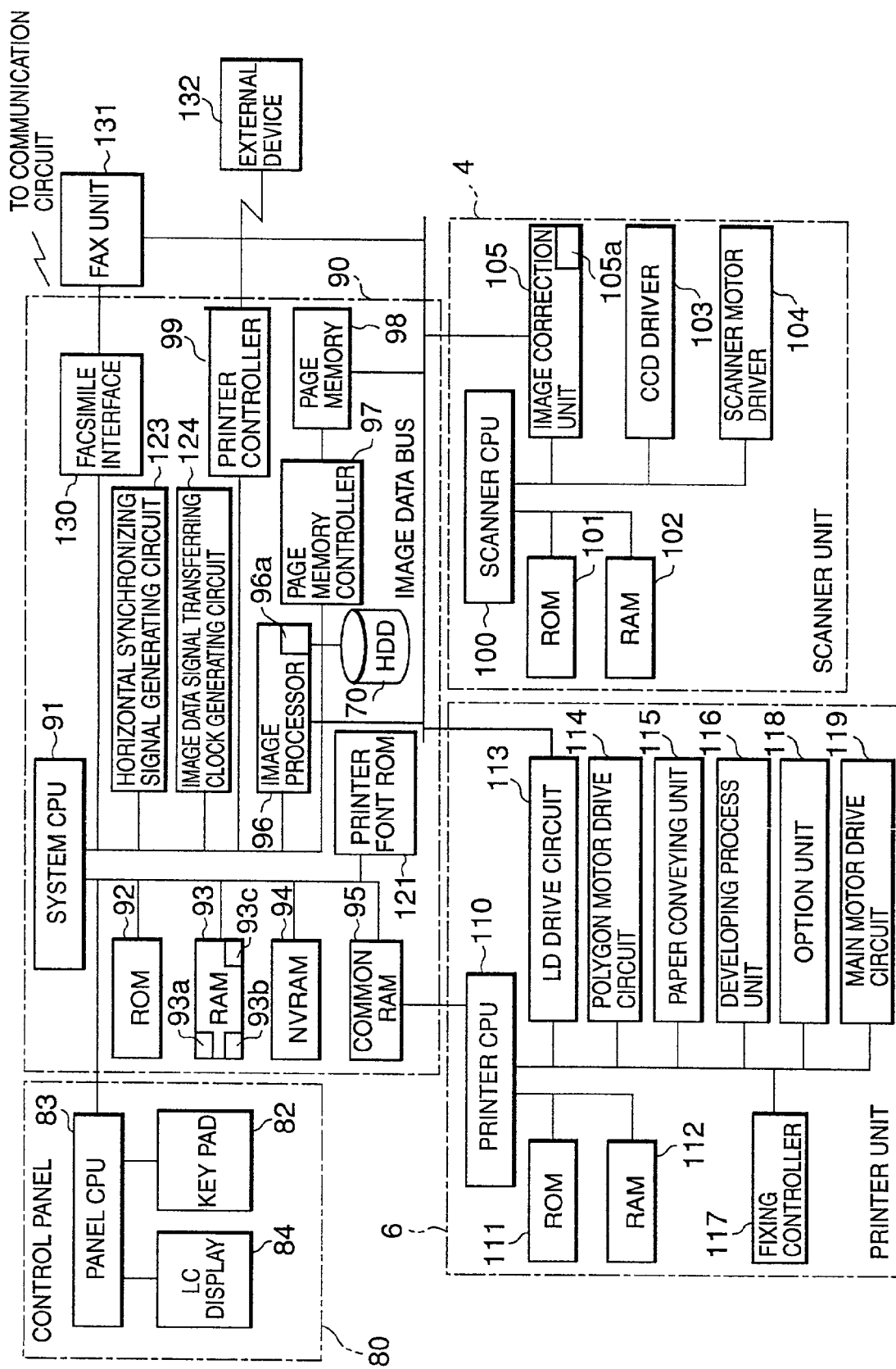
FIG. 2 is a block diagram schematically expressing the structure of the control system of the digital copier shown in FIG. 1.

FIG. 2 is a block diagram schematically showing the structure of the control system of a digital copier to which this invention is applicable.

This digital copier comprises a main controller 90 controlled by a system CPU 91, the scanner unit 4 controlled by a scanner CPU 100, the printer unit 6 controlled by a printer CPU 110, and a control panel 80 controlled by a panel CPU.

The main controller 90 comprises the system CPU 91, ROM 92, RAM 93, NVRAM 94, common RAM 95, image processor 96, page memory controller 97, page memory 98, printer font ROM 121, horizontal synchronizing signal generating circuit 123, image data signal transferring clock generating circuit 124, and facsimile interface 130.

The system CPU 91 controls the entirety of the main controller 90. The ROM 92 stores various control programs. The system CPU 91 transmits operating directions to the printer unit 6 (the printer CPU 110) and the scanner unit 4 (the scanner CPU 100) and the printer unit 2 and the scanner unit 4 return the status to the system CPU 91. The RAM 93 has a receiver buffer 93a for storing error, status and acknowledge messages, etc. from the printer unit 2 and the scanner unit 4, a transmission buffer 93b for storing messages of operating directions from the control panel 80 (the panel CPU 83), and a condition setting table 93c for storing image forming conditions.

The NVRAM (nonvolatile RAM) 94 is a nonvolatile memory backed up by battery (not shown) and holds data on the NVRAM 94 when the power source is turned OFF. Further, this NVRAM 94 stores default values (initial set values) for hardware elements comprising the copying (PPC) function, FAX function, etc. The common RAM 95 is used for the two-way communication between the system CPU 91 and the printer CPU 110.

The image processor 96 has a compression/expansion circuit 96a. This compression/expansion circuit 96a compresses the document image data read by the scanner unit 4 and stores in an HDD (hard disk drive) 70. Further, the compression/expansion circuit 96a reads compressed image data from the HDD 70 and applies the expansion process to the read image data. Further, the image processor 96 executes the image process such as the trimming, masking, etc. to image data input from the scanner unit 4. The print font ROM 121 stores font data corresponding to such code data as character codes.

A printer controller 99 receives code data such as character code from an external device 132 such as a personal computer via LAN and expands the data into image data using font data stored in the printer font ROM 121 in a size and resolution corresponding to data showing a character size and resolution given to the code data and stores in the page memory 98.

The horizontal synchronizing signal generating circuit 123 generates a horizontal synchronizing signal synchronous with the rotation of the polygonal mirror 36. The image data signal-transferring clock generating circuit 124 generates an image data signal-transferring clock to control the timing to transfer image data.

The page memory controller 97 stores and reads out image data to/from the page memory 98. The page memory 98 has an area that is capable of storing image data, for example, 2 pages and compressed image data from the scanner unit 4 or the printer controller 99 for every page.

The printer unit 6 comprises the printer CPU 110 for controlling the entirety of the printer unit 6, a ROM 111 storing control programs, a RAM 112 for storing data, an LD drive circuit 113 for controlling the light emission on/off by the semiconductor laser 41, a polygon motor drive circuit 114 for controlling the running of the motor for driving the polygonal mirror 37, a paper conveying unit 115, a developing process unit 116, a fixing controller 117, an option unit 11, and a main motor drive circuit 119.

The paper conveying unit 115 controls the conveyance of sheets of paper P by the conveying path 58 and the developing process unit 116 executes charge, development and transfer using the main charger 45, the developing device 46 and the transferring charger 48. The fixing controller 117 controls the fixing device 60; the main motor drive circuit 119 controls the rotation of the discharge paper sensor 62, the before aligning sensor 66, the option unit 118 and the main motor 77.

The polygon motor drive circuit 114 has a polygon motor control IC, generates motor drive frequency (FG pulse) according to the reference clock frequency that is input to this polygon motor control IC and controls the number of revolutions of the polygon motor.

The main motor drive circuit 119 has a main motor control IC, generates motor drive frequency (FG pulse) according to the reference clock frequency that is input to this main motor control IC from the system CPU 91 and controls the number of revolutions of the main motor 77.

The scanner unit 4 includes the scanner CPU 100, ROM 101, RAM 102, CCD driver 103, scanner motor driver 104 and image correction unit 105. The scanner CPU 100 controls the entirety of the scanner unit 4, the ROM 101 stores control programs and the RAM 102 is used for temporary data storage. The CCD driver 103 drives the CCD sensor 34, the scanner motor driver 104 controls the rotation of the driving motor 36 that moves the first and second carriages 27 and 28 of the exposure lamp 25 and the mirrors 26, 30 and 31. The image correction unit 105 includes an A/D conversion circuit for converting analog signals from the CCD sensor into digital signals, a shading correction circuit for correcting fluctuation of the threshold level to output signal from the CCD sensor 34 resulting from fluctuation or of the CCD sensor 34 or change in ambient temperature, and a gamma correction circuit. Further, it includes a line memory 105a for once storing corrected digital signals from these correction circuits. Although, not shown, an exposure lamp control unit to control the exposure lamp 25 and a driver to drive a moving mechanism to move the focusing lens 32 to a position corresponding to a set magnification.

The facsimile unit 131 receives facsimile data that are compressed bit map data transmitted via such a communication line as a public communication line from an external device, converts into image data and outputs to the main controller 90 via the facsimile interface 130.

Figure 3:
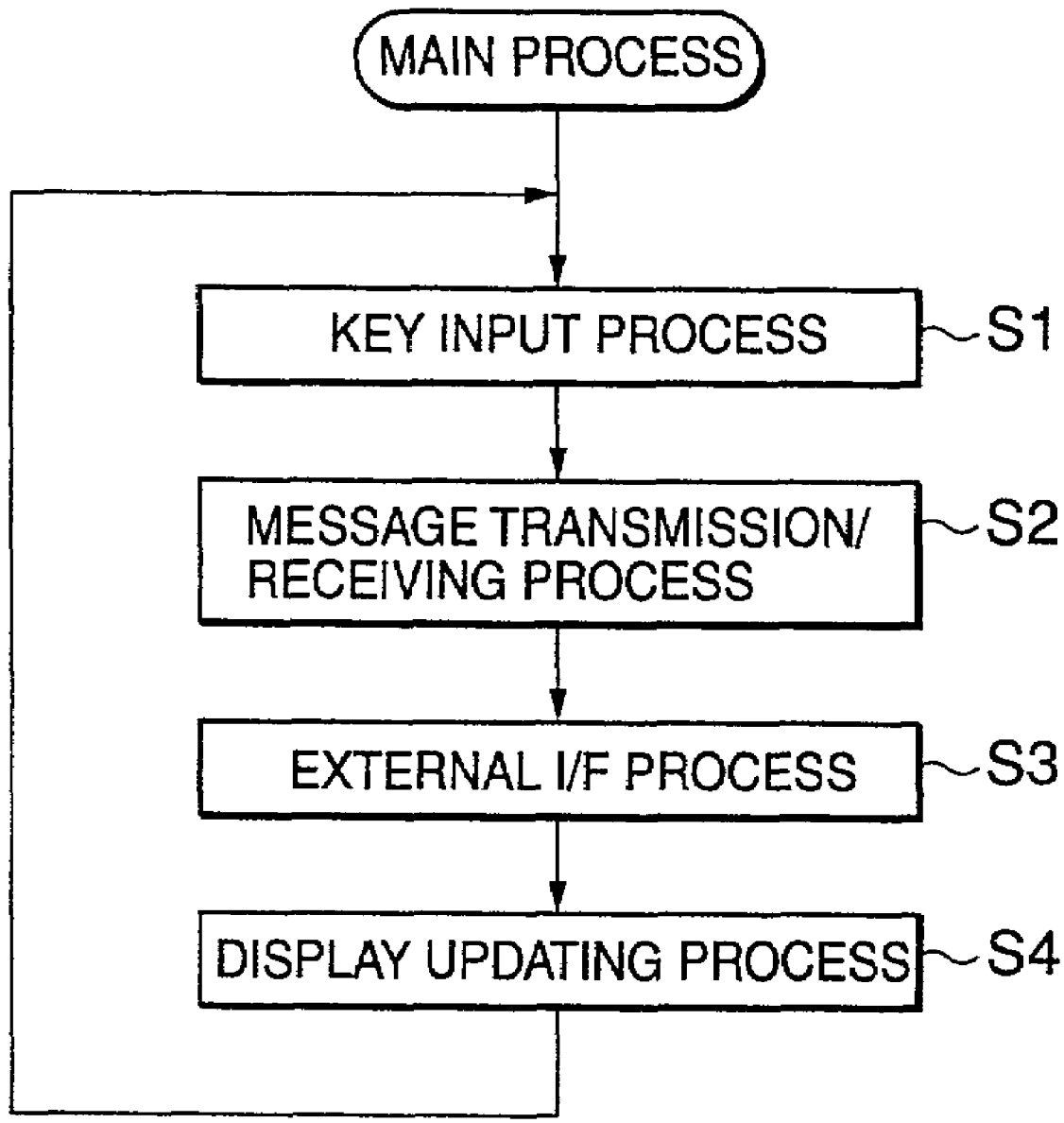
FIG. 3 is a flowchart showing the main processes of the image forming apparatus of the present invention.

Next, the image forming operation according to an embodiment of the present invention will be described. FIG. 3 is a flowchart showing the main process of the image forming apparatus shown as an embodiment of this invention. First, as shown in Step S1, the panel CPU 83 of the control panel executes the key input process.

Figure 4:
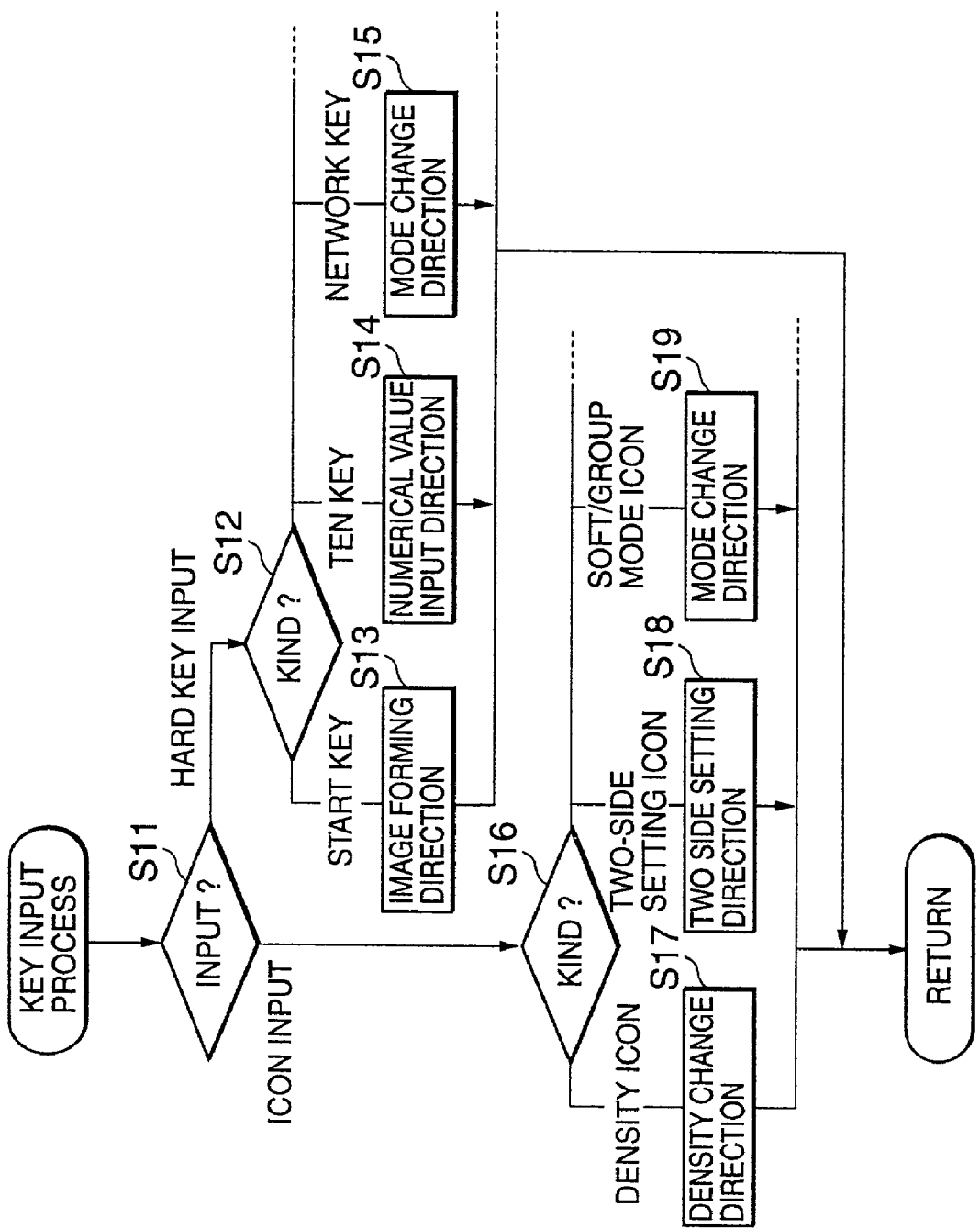
FIG. 4 is a flowchart showing a key input process.

FIG. 4 is a flowchart showing this key input process. In this embodiment, it is so explained that the panel CPU 83 of the control panel 80 executes the key input process; however, it may be executed by the system CPU 91 of the main controller 90.

The panel CPU 83 detects the control panel input by a user as shown in Step S11. When detects the hard key input by a key pad 82, the panel CPU 83 judges a kind of the hard key input as in Step S12. According to the kind of the hard key input, the panel CPU 83 transmits the operating directions to the main controller 90 as in Steps S13-S15. For example, when the hard key input was the start key, the panel CPU 83 transmits the direction to start the image forming operation to the main controller 90. This operating direction is stored in, for example, a receiver buffer.

When detecting the icon input from an LCD, the panel CPU 83 judges a kind of the icon input as in Step S16. According to the kind of the icon input, the panel CPU 83 transmits image forming conditions such as density, two side setting, etc. and setting directions to the main controller 90 as shown in Steps S17-S19. For example, when the icon input was a density change by the density icon as shown in Step S17, the panel CPU 83 transmits a density change direction together with a designated density value to the main controller 90. Further, when the icon input was the designation of the sort mode or the group mode as shown in Step S19, the panel CPU 83 transmits a direction to change the image-forming mode to the designated mode to the main controller 90. The image forming conditions thus transmitted are stored in the condition setting table 93c of the RAM 93 provided in the main controller 90.

Referring to the image forming conditions stored in the condition setting table 93c, the system CPU 91 of the main controller 90 sets the scanner unit 4 and the printer unit 6 by transmitting the image forming conditions corresponding to these units so that an image is formed by satisfying the image forming conditions.

Figure 5A:
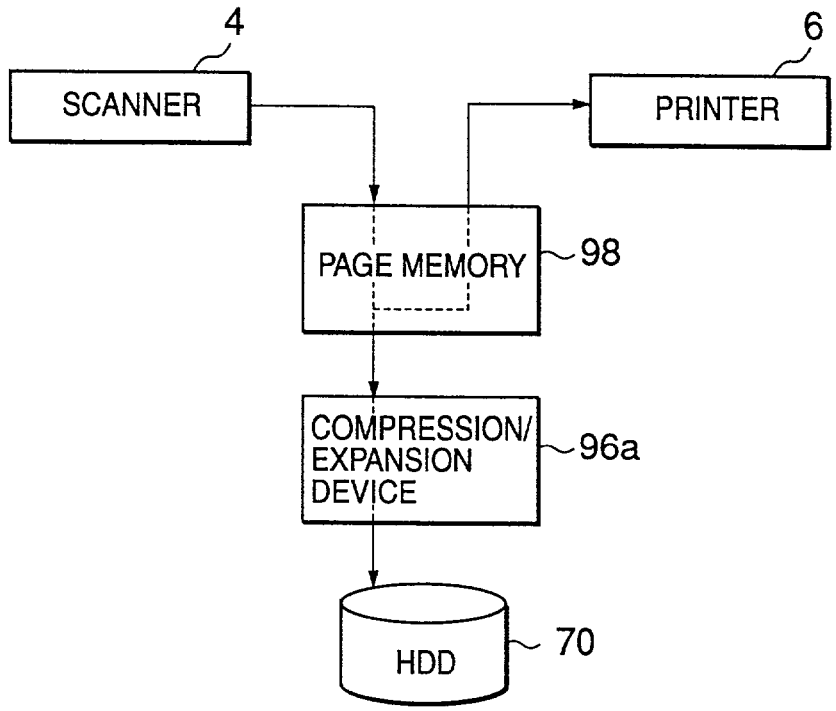
FIGS. 5A and 5B are block diagrams showing synchronous and asynchronous control operations.

When the image forming conditions stored in the condition setting table 93c are corresponding to the normal image forming operations, the system CPU 91 executes the image formation in the synchronous control mode. This normal image forming operation denotes one copy of plural sheets of a document or plural number of copies using the copying or the ADF with a document placed on the document table. FIG. 5A is a block diagram showing this synchronous control operation. In the case of the synchronous control, an image is formed by placing the scanner synchronous with the printer via the page memory for each page. In other words, the document image data read by the scanner 4 is written into the page memory in a unit of page under the control of the page memory controller 97. The page memory 98 has storage areas, for example, 2 pages of document images and document image data are written into each area alternately. The image data written in the page memory 98 are transmitted to the printer 6 in a unit of page and also, compressed by the compression/expansion circuit 96a and stored in the HDD 70. This is for recovering images that are lost by paper jam, etc. Accordingly, in this synchronous control, the scanner 4 and the printer 6 operate synchronous with each other for every page.

When the image forming conditions stored in the condition setting table 93c correspond to the image forming operation in the group mode, the system CPU 91 so notifies the scanner unit 4 and the printer unit 6 and forms an image in the group mode. The group mode is a mode to read plural sheets of documents and print plural number of sheets for each page as described above.

Figure 5B:
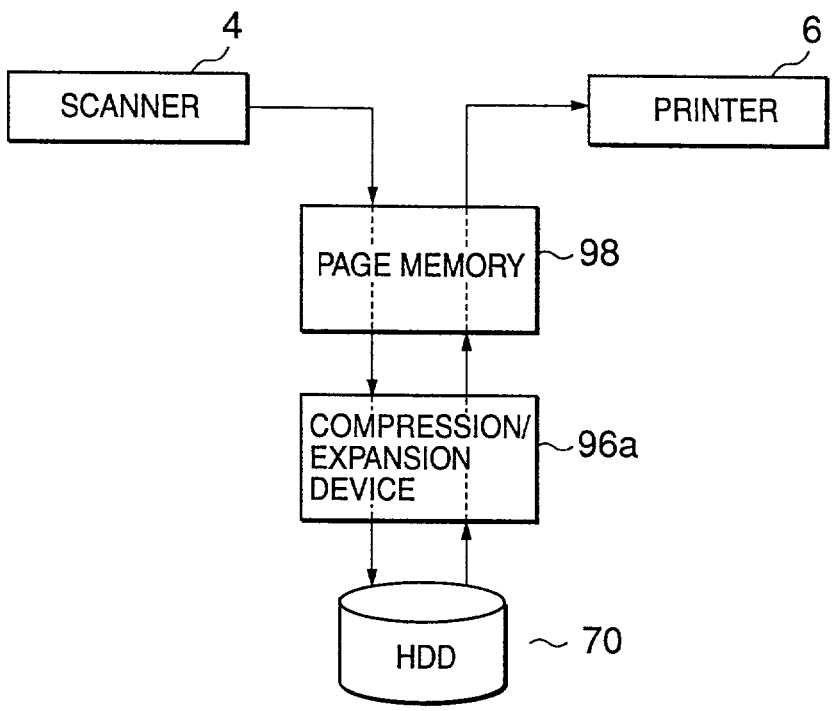

When the image formation is carried out in the group mode, the system CPU 91 performs the image formation in the asynchronous control mode. FIG. 5B is a block diagram showing this asynchronous control operation. In the case of the asynchronous control, scanned image data are accumulated in the HDD 70, and the image data accumulated in the HDD 70 are read out and printed by the printer. That is, the document image data read by the scanner 4 are written into the page memory 98 in a unit of page under the control of the page memory controller 97 and then, compressed by the compression/expansion circuit 96a and stored in the HDD 70. The image data stored in the HDD 70 are expanded by the compression/expansion circuit 96a, written into the page memory 98 and then, sent to the printer 6. That is, in this asynchronous control mode, the scanner 4 and the printer 6 operate asynchronously.

Figure 6:
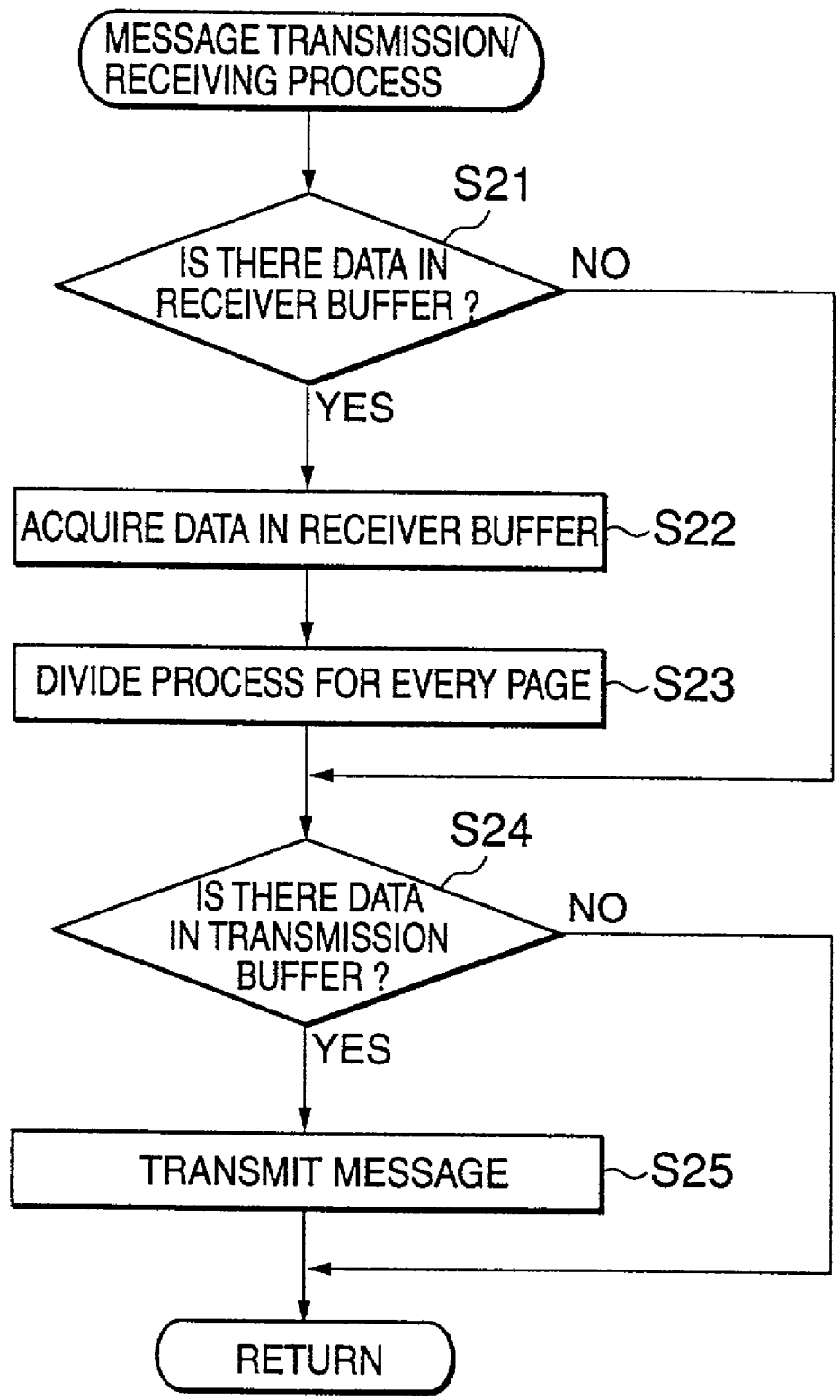
FIG. 6 is a flowchart showing a message exchange processes.

Then, the system CPU 91 carries out the message exchange process as shown in Step S2. FIG. 6 is a flowchart showing this message exchange process. First, the system CPU 91 judges whether a message is received by the receiver buffer 93a and if received, acquires that message data (Step S22) and carries out a process corresponding to the message (Step S23). For example, when an error message of "NO PAPER" was received in the receiver buffer 93a from the printer 6, the system CPU 91 directs the panel CPU 83 to display it.

Then, the system CPU 91 judges whether a message is in the transmission buffer 93b as shown in Step S24 and when there is a message, the system CPU 91 transmits an operating direction corresponding to that message (Step S25). For example, when a message stored in the transmission buffer is a normal image forming operation-starting direction, the system CPU 91 directs the scanner unit 4 to start the scanning.

After the message exchanging process, the system CPU 91 executes the external interface process as in Step S3. That is, when there was a printer job-receiving request from an external device 132 through the printer controller 99, the system CPU 91 receives data from the external device 132 and prints it using the printer 6.

Then, when it is necessary to update the display on the LCD of the control panel 80, the system CPU 91 executes the display updating process as in Step S4. For this display update process, the state wherein the image forming apparatus 10 waits a job from user for more than a prescribed time continues and when the apparatus is kept in the pre-heating state for power saving, the display to inform it are included. After this display update process, the operating flow is returned to Step S1 and the main process is repeated.

Next, the printer error check when the image forming start key was depressed and the image formation was started will be described. This printer error check is the process included in Steps S22 and S23 shown in FIG. 6.

Figure 7:
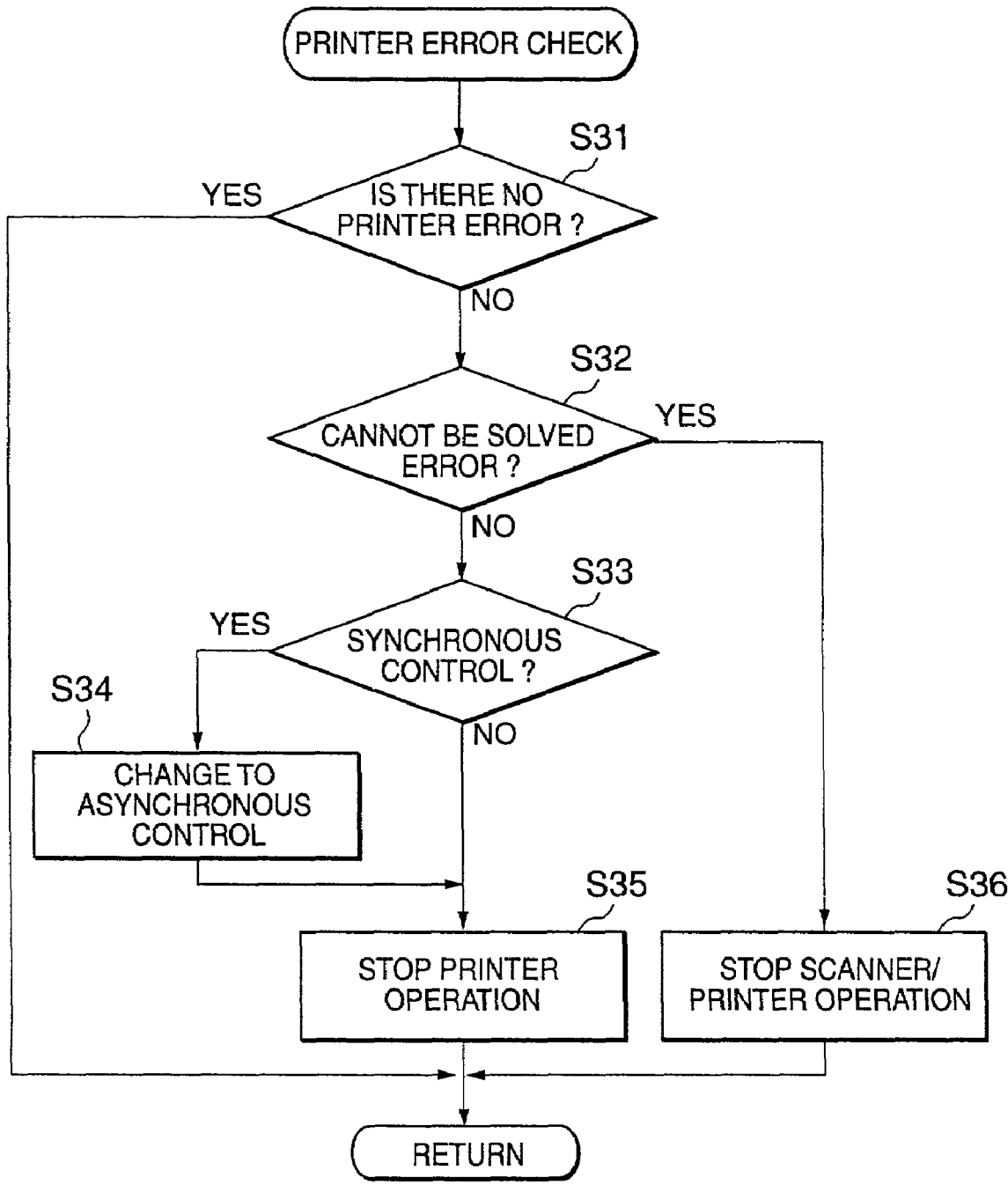
FIG. 7 is a flowchart showing a printer error check operation of the present invention.

FIG. 7 is a flowchart showing the printer error check operation according to the present invention. This printer error check is carried out referring to the printer error message acquired from the receiver buffer 93a in Step S22 shown in FIG. 6.

First, when there is no printer error as in Step 31, the system CPU 91 do nothing and returns to Step S1. Then, the system CPU 91 checks whether there is an error that cannot be solved as in Step S32. This error that cannot be solved includes, for example, such a case where the stapling process and the equal magnification copy using the ADF are designated through the control panel 80 and a document size automatically discriminated when started to convey a document is too small for the stapling process. In this case, when stapling, plural number of image formed sheets are not sufficiently clamped and cannot be properly stapled.

In the case of an error that can be solved (Step S32: NO), the system CPU 91 judges whether the current control is the synchronous control (Step S33). In the case of the synchronous control, the system CPU 91 changes the mode to the asynchronous control (Step S34) and suspends the printer operation (Step S35). When a generated error cannot be solved (Step S32: YES), the system CPU 91 suspends the operations of the scanner and the printer (Step S36).

Further, when an error that cannot be solved is related to the stapling process as described above, a document size is made clear only when a document is conveyed on the document table by the ADF and therefore, this error is generated soon after the start key is depressed. Accordingly, in such a case, the operations of the scanner and the printer are suspended soon after the start key is depressed as in Step S36.

In the embodiment described above, when an error relative to the printer unit is generated, the process was explained to continuously operate the scanner after changing the synchronous control to the asynchronous control. When an error relative to the scanner unit is generated, this invention is also similarly applicable. That is, when an error relative to the scanner is generated during the image forming operation, it is possible to continue the operation of the printer unit by changing the synchronous control to the asynchronous control. Such an image forming apparatus is particularly effective when printing many documents in plural number of sheets. For example, if a document is jammed in the ADF of the scanner unit at the time when several sheets of the document are read, it is possible to read out the document image data that was already read from the HDD and print plural copies by the printer unit while this error is being solved by user. Accordingly, the printing efficiency can be promoted.

According to the present invention as described above, the scanner and printer devices can be utilized efficiently according to the control method. Furthermore, even when errors are taken place, applicable processes are carried out precedent and therefore, productivity is improved accordingly.

What is claimed is:

1. An image forming apparatus, comprising:
   a scanner to read a document and provide image data corresponding to a document image;
   a printer to form an image corresponding to the image data provided from the scanner;

an error detector to detect an operating error of the scanner and the printer that are devices;

a controller to stop an operation of the device that cause the error and operate the device only that did not cause the error when the error detector detects the operating error;

means for setting an image forming condition;

means for deciding whether a synchronous control for operating the scanner and the printer in synchronous with each other for every page of document images is used or an asynchronous control for operating the scanner and the printer in asynchronous with each other is used when forming an image based on the image forming conditions that are set by the means for setting;

a first memory to store image data;

compression/expansion means for compressing or expanding the image data; and a second memory to store the image data compressed by the compression/expansion means, wherein the image forming apparatus is controlled based on the control decided by the means for deciding, wherein in the case of the synchronous control, the document image data read by the scanner is stored in the first memory and then, provided to the printer and also compressed by the compression/expansion means and stored in the second memory, in the case of the asynchronous control, the document image data read by the scanner is stored in the first memory, compressed by the compression/expansion means, stored in the second memory, expanded by the compression/expansion circuit, stored in the first memory and then, provided to the printer; and means for switching the synchronous control to the asynchronous control when the synchronous control is decided by the means for deciding and an error is generated during the image forming operation.

2. An image forming method, comprising:

reading a document by a scanner that is a device to provide image data corresponding to a document image;

forming an image corresponding to the image data provided from the scanner by a printer that is a device;

detecting operating errors of the scanner and the printer;

suspending the operation of the device generating an error and operating the device not generating an error when the operating error is detected;

setting the image forming conditions;

deciding whether a synchronous control for operating the scanner and the printer synchronously for each page of document images is used or an asynchronous control for operating the scanner and the printer asynchronously is used based on the set image forming conditions when executing the image formation;

executing control based on the decided control;

firstly storing image data;

compressing/expanding the image data;

secondly storing the image data compressed in the compressing/expanding step, wherein in the case of the synchronous control, the document image data read by the scanner is stored in the firstly storing step and then provided to the printer, and the document image data is also compressed in the compression/expansion step and stored in the secondly storing step, and in the case of the asynchronous control, the document image data read by the scanner is stored in the firstly storing step and then, compressed in the compression/expansion step and stored in the secondly storing step or expanded in the compression/expansion step and stored in the firstly storing step, and then provided to the printer; and switching the synchronous control to the asynchronous control when the synchronous control is decided in the deciding step and an error is generated during the image forming operation.

* * * * *

UNITED STATES PATENT AND TRADEMARK OFFICE
CERTIFICATE OF CORRECTION

| | | |
|---|---|---|
| PATENT NO. | : 7,583,395 B2 | Page 1 of 1 |
| APPLICATION NO. | : 10/003257 | |
| DATED | : September 1, 2009 | |
| INVENTOR(S) | : Akira Ohtsu | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (1,972) days Delete the phrase "by 1,972 days" and insert -- by 2,399 days --

Signed and Sealed this

Thirteenth Day of April, 2010

David J. Kappos
*Director of the United States Patent and Trademark Office*